(12) United States Patent
Czajkowski et al.

(10) Patent No.: US 7,698,705 B1
(45) Date of Patent: Apr. 13, 2010

(54) METHOD AND SYSTEM FOR MANAGING CPU TIME CONSUMPTION

(75) Inventors: Grzegorz Jan Czajkowski, Menlo Park, CA (US); Michael John Jordan, Palo Alto, CA (US); Glenn Carlton Skinner, Palo Alto, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1576 days.

(21) Appl. No.: 10/968,737

(22) Filed: Oct. 19, 2004

(51) Int. Cl.
G06F 9/46 (2006.01)
(52) U.S. Cl. .......................... 718/1; 718/104
(58) Field of Classification Search ............ 718/1, 718/104
See application file for complete search history.

(56) References Cited

U.S. PATENT DOCUMENTS

| | | | |
|---|---|---|---|
| 7,441,242 B2 * | 10/2008 | Barsness et al. ............ 718/104 |
| 7,458,077 B2 * | 11/2008 | Duke ............................ 718/102 |
| 2002/0099760 A1 * | 7/2002 | Liang ........................... 709/107 |
| 2004/0255295 A1 * | 12/2004 | Stackhouse et al. .......... 718/100 |
| 2005/0235285 A1 * | 10/2005 | Monasterio ................... 718/100 |

OTHER PUBLICATIONS

Liang et al., "Comprehensive Profiling Support in the Java Virtual Machine", 1999, USENIX, pp. 1-13.*

* cited by examiner

Primary Examiner—Meng-Ai An
Assistant Examiner—Kenneth Tang
(74) Attorney, Agent, or Firm—Osha • Liang LLP

(57) ABSTRACT

A method for managing CPU time consumption, involving obtaining a per-polling period CPU consumption time associated with an isolate executing on a virtual machine for each of a plurality of polling periods, computing a usage rate for the isolate over a usage period using the per-polling period CPU consumption time associated with each of the plurality of polling periods within the usage period, comparing the usage rate to a specified rate associated with the isolate, and suspending the isolate in the virtual machine if the usage rate exceeds the specified rate.

22 Claims, 4 Drawing Sheets

METHOD AND SYSTEM FOR MANAGING CPU TIME CONSUMPTION

BACKGROUND

With the use of safe language platforms, such as the Java programming language, to develop more sophisticated applications for a wide-range of environments, pressure to make more system programming features available to application developers is increasing. A particular area in which safe language platforms lag behind operating system functionalities is that of resource management.

Managing resources used by applications running on a virtual machine platform (i.e., a platform including a virtual machine that allows applications to execute on that platform regardless of the platform the application is originally programmed to execute) plays an important role in controlling over-use of resources, preventing denial of service attacks, and providing load balancing within the system. A resource is a measurable entity that a program needs in order to perform necessary functionalities (e.g., memory, CPU time, etc.).

Conventionally, management of resources at the virtual machine level is handled by the operating system. In order to manage multithreading and thread priorities, most modern implementations of virtual machines rely on kernel threads and the associated kernel thread scheduler to implement these functionalities. In some instances, allowing the operating system to manage resources used by applications executing on the virtual machine causes the virtual machine to lose control of the resources.

For example, it may be necessary to partition CPU time among groups of threads executing in the same virtual machine. A group of threads executing in the same virtual machine may be referred to as an "isolate." Specifically, two isolates may execute in an isolate-enabled virtual machine and the first isolate should be allocated twenty percent of the CPU resources while the other isolate is allocated the remaining eighty percent. To provide such allocation, management and control of isolate resources within the virtual machine is required instead of relying on management of application resources using kernel level resource management at the operating system level.

SUMMARY

In general, in one aspect, the invention relates to a method for managing CPU time consumption, comprising obtaining a per-polling period CPU consumption time associated with an isolate executing on a virtual machine for each of a plurality of polling periods, computing a usage rate for the isolate over a usage period using the per-polling period CPU consumption time associated with each of the plurality of polling periods within the usage period, comparing the usage rate to a specified rate associated with the isolate, and suspending the isolate in the virtual machine if the usage rate exceeds the specified rate.

In general, in one aspect, the invention relates to a system, comprising an operating system configured to provide a CPU consumption time for an isolate during a polling period, and a virtual machine configured to execute the isolate, obtain a per-polling period CPU consumption time associated with an isolate executing on a virtual machine for each of a plurality of polling periods compute a usage rate for the isolate over a usage period using the per-polling period CPU consumption time associated with each of the plurality of polling periods within the usage period, compare the usage rate to a specified rate associated with the isolate, and suspend the isolate in the virtual machine if the usage rate exceeds the specified rate.

In general, in one aspect, the invention relates to a computer system for managing CPU consumption time, comprising a processor, a memory, a storage device, and software instructions stored in the memory for enabling the computer system under control of the processor, to obtain a per-polling period CPU consumption time associated with an isolate executing on a virtual machine for each of a plurality of polling periods, compute a usage rate for the isolate over a usage period using the per-polling period CPU consumption time associated with each of the plurality of polling periods within the usage period, compare the usage rate to a specified rate associated with the isolate, and suspend the isolate in the virtual machine if the usage rate exceeds the specified rate.

Other aspects of the invention will be apparent from the following description and the appended claims.

DETAILED DESCRIPTION

Figure 1:
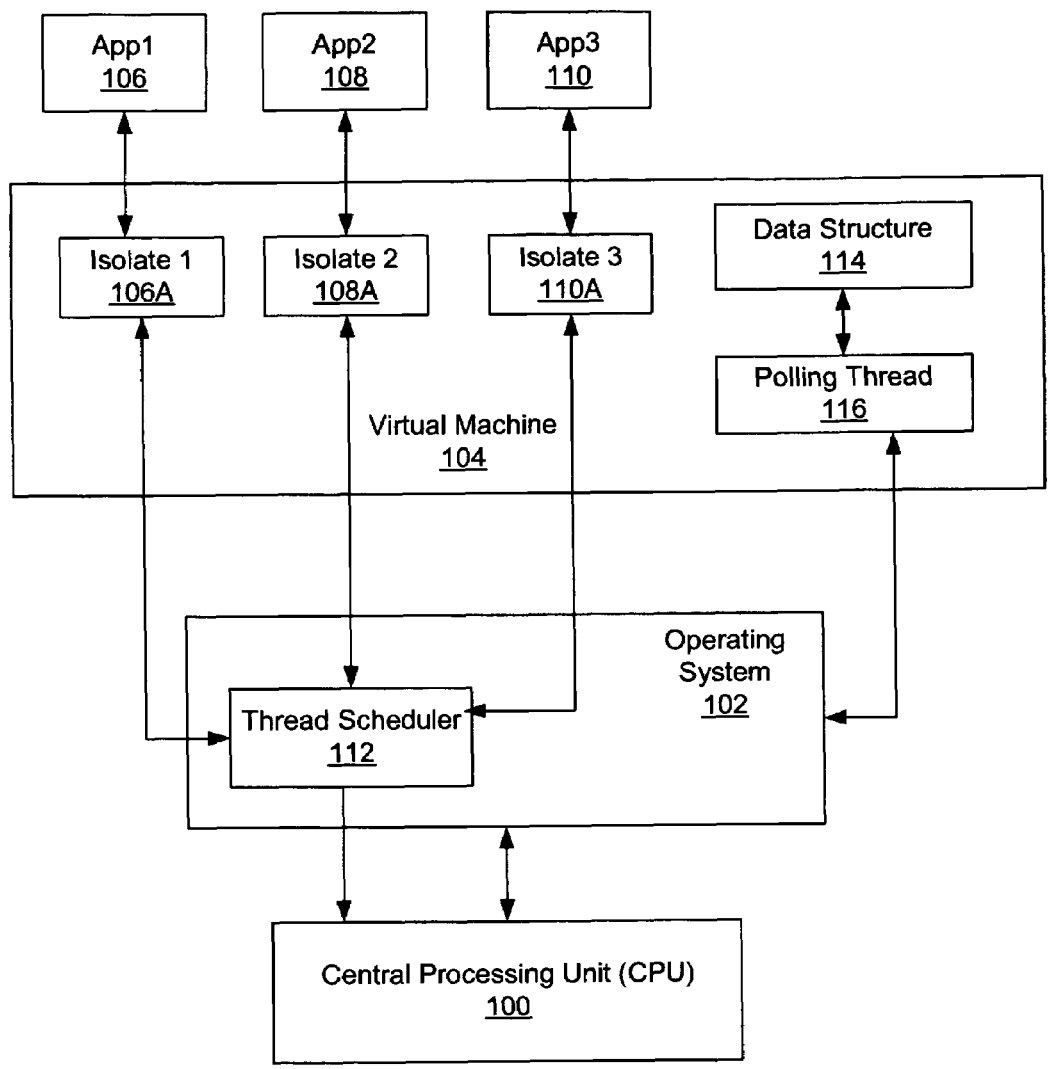
FIG. 1 shows a system in accordance with one embodiment of the invention.

Specific embodiments of the invention will now be described in detail with reference to the accompanying figures. Like elements in the various figures are denoted by like reference numerals for consistency. Further, the use of "ST" in the drawings is equivalent to the use of "Step" in the detailed description below.

In the following detailed description of embodiments of the invention, numerous specific details are set forth in order to provide a more thorough understanding of the invention. In other instances, well-known features have not been described in detail to avoid obscuring the invention.

In general, embodiments of the invention relate to managing central processing unit (CPU) time consumption of isolates. More specifically, embodiments of the invention relate to comparing a usage rate used by an isolate in a specified usage period to a specified rate. Further, embodiments of the invention relate to suspending isolates that exceed the specified rate for a sufficient period to allow the usage rate to return below the specified rate.

FIG. 1 shows a system for managing CPU consumption time in accordance with one embodiment of the invention. The system includes a CPU (100), an operating system (102), a virtual machine (104), and several applications (i.e., App1 (106), App2 (108), App3 (110)) running on the virtual machine (104). Further, each application (106, 108, 110) is associated with an isolate (i.e., Isolate 1 (106A), Isolate 2 (108A), Isolate 3 (110A)).

In one embodiment of the invention, an isolate is a group of threads executing on the virtual machine (104) that do not share states with other isolates. More specifically, isolates include multiple virtual machine threads that correspond to applications running on the virtual machine (104). Those skilled in the art will appreciate that although FIG. 1 shows one isolate per application, there may be several isolates corresponding to one application. Virtual machine threads are implemented using the kernel threads in the operating system (102). In one embodiment of the invention, a one-to-one mapping exists between the kernel threads in the operating system (102) and the virtual machine threads. The virtual machine threads are subsequently grouped to form an isolate. In one embodiment of the invention, each virtual machine thread is grouped in an isolate (e.g., Isolate 1 (106A), Isolate 2 (108A), Isolate 3 (110A), etc.) and upon creation, records its kernel thread identifier and adds itself to the list of all threads in the same isolate (e.g., 106A, 108A, 110A). In one embodiment of the invention, the virtual machine (104) is a Java™ Virtual Machine (JVM), and the operating system (102) implements JVM threads that form isolates (e.g., Isolate 1 (106A), Isolate 2 (108A), Isolate 3 (110A), etc.). In this case, isolates may be an encapsulated Java program or Java application component.

Continuing with FIG. 1, the virtual machine (104) includes a polling thread (116) that wakes up at the completion of each polling period, which is the length of a polling interval (e.g., 10 s), to obtain the CPU consumption time for each isolate. In one embodiment of the invention, the polling interval may be of arbitrary length. In one embodiment of the invention, the polling thread (116) queries the operating system (102) at the completion of each polling period to obtain the CPU consumption time of the isolates executing on the virtual machine (104). In one embodiment of the invention, the polling thread (116) stores the CPU consumption values and timestamps on a per-polling period basis of isolates in a corresponding data structure (114). Those skilled in the art will appreciate that the data structure (114) may be any data structure capable of storing data, including an array, a linked list, a doubly linked list, a table, etc. For example, if the polling interval is 10 s, then the data structure may have CPU consumption times for each isolate at polling period 1 (0-10 s), polling period 2 (10-20 s), etc.

In one embodiment of the invention, the virtual machine includes functionality to compute a usage rate for each isolate based on the CPU consumption times recorded by the polling thread. In one embodiment of the invention, the usage rate of an isolate corresponds to the total CPU consumption time of the isolate during a usage period. Further, the usage period is the length of a usage interval. Specifically, the usage period is a length of time for which the isolate (or application associated with the isolate) has been limited to a specified CPU consumption rate (i.e., a constraint). For example, if an application is given a specified rate of 20% or 0.2 units of CPU consumption time over a usage interval of 35 seconds, then the isolate associated with the application is limited to 7 s of CPU consumption time for every usage period of 35 s (i.e., 20% of 35 s is 7 s). In one embodiment of the invention, the specified rate is a pre-defined usage rate that may be given to the application associated with the isolate or may be specified by a system administrator, developer, etc.

Those skilled in the art will appreciate that in one embodiment of the invention, there may be several polling threads executing in the virtual machine such that each polling thread obtains the CPU consumption time for a particular isolate executing in the virtual machine.

Further, the operating system (102) includes a thread scheduler (112). In one embodiment of the invention, the thread scheduler (112) is responsible for scheduling isolates on the CPU (100). The thread scheduler (112) also includes functionality to manage multi-threading, thread priorities, etc. Typically, threads of each isolate executing on the virtual machine (104) are scheduled by the thread scheduler (112) in the same manner as other threads for use of CPU time. Those skilled in the art will appreciate that the hardware layer including the CPU (100) in FIG. 1 may include multiple CPUs and other hardware that may be necessary to perform resource management of the present invention.

Figure 2:
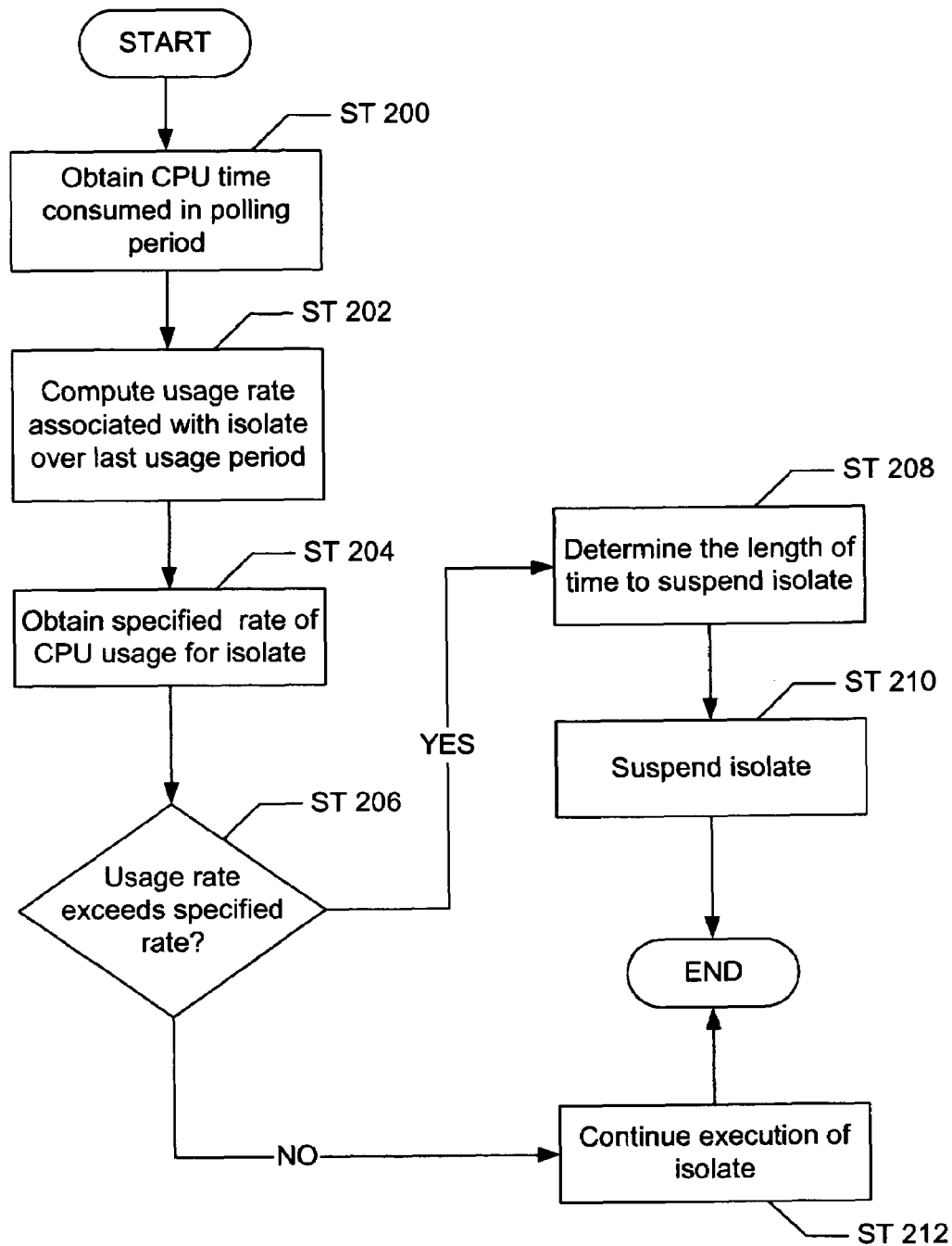
FIG. 2 shows a flow chart for managing CPU time consumption in accordance with one embodiment of the invention.

FIG. 2 shows a flow chart for managing CPU consumption time in accordance with one embodiment of the invention. Initially, a polling thread obtains CPU consumption time associated with an isolate during a polling period (Step 200). In one embodiment of the invention, the polling thread queries the operating system to obtain the CPU time consumption of an isolate. As described above, the polling thread then stores the CPU time consumption data for the isolate into a data structure, including the timestamp for the particular polling period for which the measurement was obtained (not shown). In one embodiment of the invention, the polling thread records information into the data structure, including the isolate's identification, the time that the CPU time consumption measurement is taken, and the usage rate of the isolate at that particular time.

Subsequently, a usage rate is computed for the isolate over the last usage period (Step 202). In one embodiment of the invention, the usage rate for an isolate is calculated by summing the CPU time consumption entries in the data structure for each polling period that falls within the usage period. In particular, the data structure is scanned and the entries including a timestamp within the last usage period are added up to obtain a total CPU consumption time associated with the isolate. In one embodiment of the invention, if the current time does not encompass an entire usage period, then the usage rate for the isolate is computed using all the CPU consumption times leading up to the current time. For example, if the usage interval is 35 s, and the polling threads wakes up at 20 s, this indicates that a usage period of 35 s has not elapsed. In this case, all the CPU consumption times up to and including the value obtained at 20 s are used to compute the usage rate of the isolate. Those skilled in the art will appreciate that in one embodiment of the invention, the CPU consumption time for a portion of a polling period may be used to calculate the usage rate of an isolate (i.e., if the entire polling period is not within a usage period) (discussed below in FIG. 3).

Continuing with FIG. 2, in one embodiment of the invention, the polling thread subsequently calls a policy method to obtain a specified usage rate (i.e., a constraint) for the isolate (Step 204). As noted above, the specified usage rate is the CPU consumption rate to which the isolate is bounded over a usage interval. Once the specified usage rate for the isolate is obtained, the usage rate computed for the isolate is compared to the specified rate (Step 206). If the usage rate computed for the isolate exceeds the specified rate, then a computation is performed to determine the length of time to suspend the isolate (Step 208) and the isolate is suspended for the computed length of time (Step 210). In contrast, if the usage rate computed is below the specified rate, the execution of the isolate continues until another usage rate is computed during the next polling period (Step 212).

Those skilled in the art will appreciate that there may be several isolates associated with one application. In this case, all the isolates usage rates are combined to determine the total CPU usage associated with the application. The total CPU usage is then compared to the specified rate corresponding to the application by the policy method. Further, those skilled in the art will appreciate that the CPU time consumed by the polling thread is excluded from the aforementioned computation of the usage rate. Further, the CPU time consumed by the polling thread is not stored in the data structure.

Returning to Step 208, in one embodiment of the invention, suspending the isolate includes forcing the isolate to sleep (i.e., go dormant) for a length of time that allows the usage rate of the isolate to be brought below the specified rate. In one embodiment of the invention, the isolate is suspended for time (Z) using the formula:

$$I/(U+Z)=Q/U,$$

where I is the total CPU time consumption of the isolate over the usage interval (U), U is the usage interval length, and Q/U is the specified rate (i.e., specified CPU consumption time (Q) over the usage interval (U)). In one embodiment of the invention, the function used to compute the value of Z above is a uniform discrete distribution function. Those skilled in the art will appreciate that any function whose integral over a polling period equals the computed usage rate may be used to determine the amount of time that an isolate is suspended.

In one embodiment of the invention, before the isolate is suspended, the entries in the data structure related to the isolate's CPU usage for the most recent polling interval may be updated. Specifically, entries older than the last usage interval are discarded, and each remaining entry in the data structure may be updated to reflect the amount of time (Z) for which the isolate is to be suspended.

In one embodiment of the invention, the suspended isolate awakens and resumes execution upon completion of the time period for which the isolate was forced to sleep. Those skilled in the art will appreciate that the process shown in FIG. 2 is repeated each time the polling thread awakens (i.e., at each polling period). As a result of the process shown in FIG. 2, CPU time consumption, although recorded only at discrete points in time, may be considered continuous. Further, by specifically using U+Z as an interval over which to distribute the CPU time usage of an isolate, the isolate (and therefore, the corresponding application) experiences smoother behavior.

Figure 3:
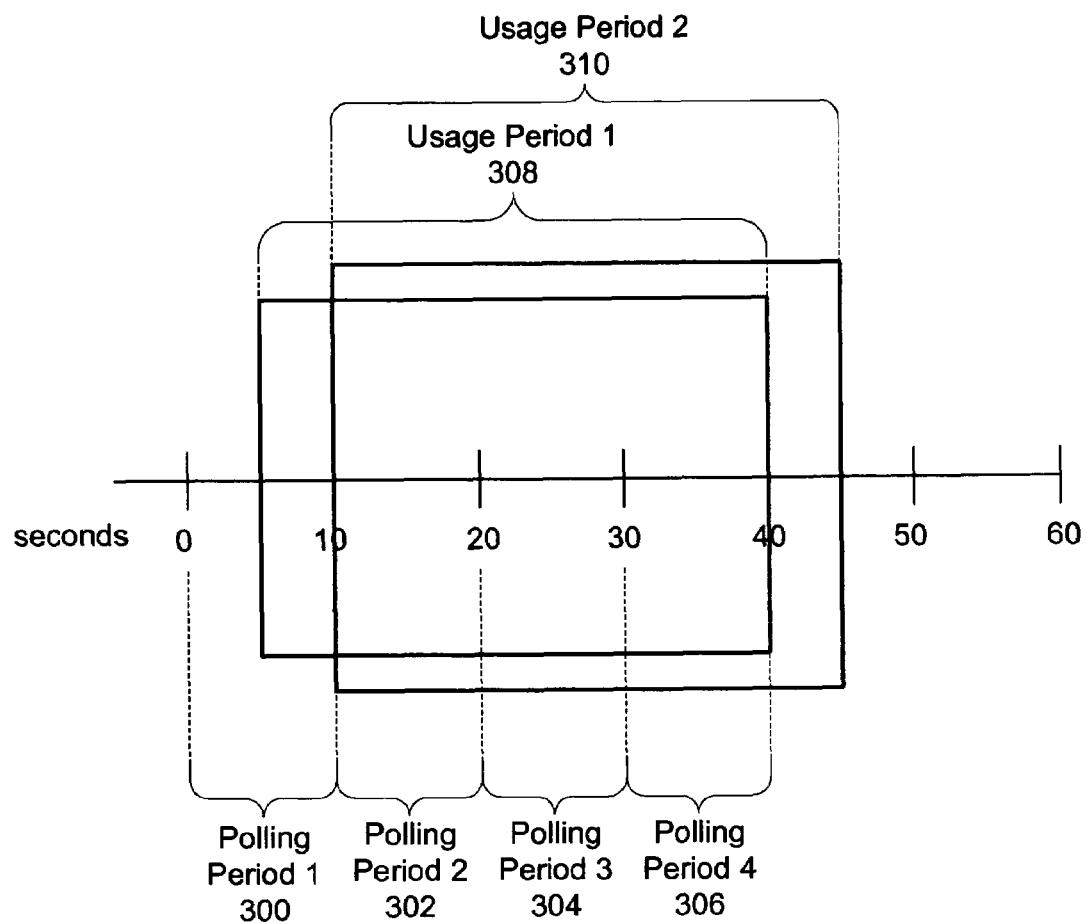
FIG. 3 shows an example of managing CPU time consumption in accordance with one embodiment of the invention.

FIG. 3 shows an example that illustrates managing CPU consumption times in accordance with one embodiment of the invention. Consider the scenario in which a polling thread obtains CPU consumption time for an isolate every 10 s (i.e., the polling interval is 10 s in length), and the usage interval is 35 s. Thus, every 10 s a CPU consumption time is obtained and a usage rate is calculated. Further, each usage period is 35 s in length. Using this information, suppose that a specified usage rate given by a policy method associated with an application corresponding to the isolate is 0.2 (i.e., 20% of CPU consumption time for a 35 second usage interval). Thus, for every 35 second usage period (e.g., 308, 310), the isolate is bound to 7 s of CPU time.

Now suppose that the polling thread wakes up at polling period 1 (300). Subsequently, the polling thread queries the operating system to obtain a CPU consumption time for polling period 1 (300) and stores the CPU consumption time in an associated data structure. At 10 s, when the polling thread wakes up, a usage rate computation is performed. The value of CPU consumption obtained at 10 s is used by the policy method to determine whether to suspend the isolate. If the isolate has already consumed too much CPU time (e.g., the isolate may have already used 7 s or more CPU time), then the policy method determines that the isolate is to be suspended.

Continuing with FIG. 3, at 20 s, the polling thread again wakes up and obtains a CPU consumption time for the isolate and the process described above repeats. For this example, consider the scenario where the polling thread obtains CPU consumption times at each of polling period 1 (300), polling period 2 (302, polling period 3 (304) and polling period 4 (306). At polling period 4 (306), the usage period from 5 s to 40 s includes a 35 s usage interval (i.e., Usage Period 1 (308)).

Thus, all the entries in the data structure within usage period 1 (308) are summed to determine the total CPU consumption time for the isolate within usage period 1 (308). Only the entries in the data structure that are marked with a timestamp not older than (T-U) are scanned, where T is the current time (i.e., 40 s) and U is the usage interval (i.e., 35 s). Thus, using this calculation, only the entries with a timestamp not older than 5 s need to be scanned and summed.

Those skilled in the art will appreciate that only half of polling period 1 (300) is used to calculate the usage rate for usage period 1 (308) because the usage period occurs from 5 s to 40 s. In one embodiment of the invention, the CPU consumption time for polling period 1 (300) may be determined by taking half of the total CPU consumption time obtained by the polling thread for polling period 1 (300). For example, if the CPU consumption rate for polling period 1 (300) is 3 s, then the CPU consumption value used to calculate the usage rate for usage period 1 (308) would be 1.5 s.

In order to illustrate the calculation for the amount of time for which the isolate is forced to sleep, suppose that the usage rate computed for the isolate at 40 s is 8.75 s over a 35 s usage interval, or 25%. Thus, the usage rate computed for the isolate exceeds the specified rate of 0.2 or 20%. At this point, a determination is made that the isolate must be suspended such that the usage rate of the isolate reduces to a value below the specified rate. The value of time that the isolate is forced to sleep is calculated using the formula described above (i.e., $I/(U+Z)=Q/U$), where I is 8.75 s, and Q/U is 0.2. Using this calculation, the time that the isolate is forced to sleep (Z) is 8.75 s. As noted above, before the isolate is suspended, the entries in the data structure related to the isolate's CPU consumption time may be updated. Specifically, all the entries remaining (after the entries older than the last usage interval are discarded) may be optionally updated to include the time of suspension (Z). If this option is implemented, the usage rate of the isolate is attributed not only to when the isolate was executing, but rather the usage is attributed uniformly across the entire interval U+Z. Those skilled in the art will appreciate that the process illustrated in FIG. 3 repeats for the next usage period (310) from 10 s to 45 s.

Figure 4:
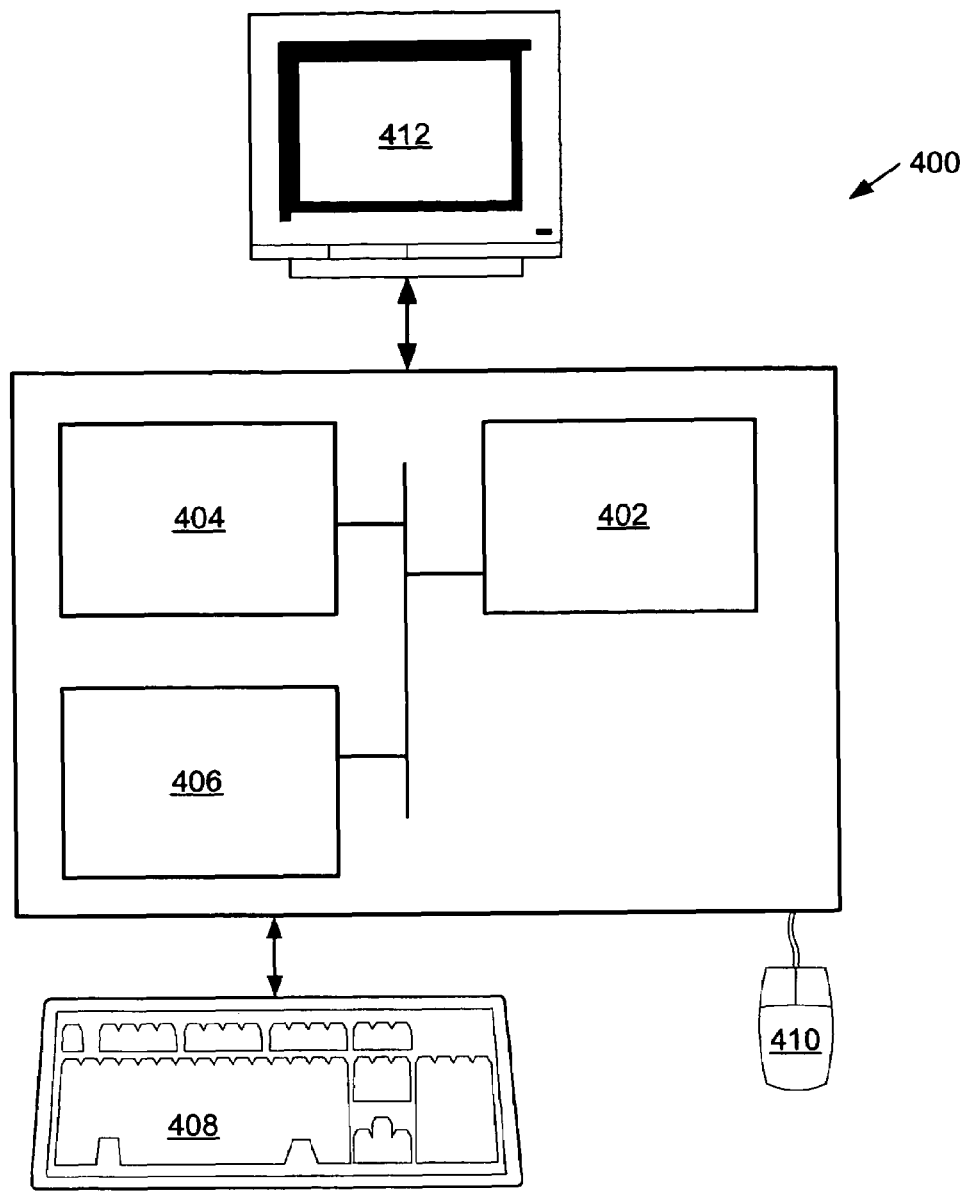
FIG. 4 shows a computer system in accordance with one embodiment of the invention.

One or more embodiments of the invention may be implemented on virtually any type of computer regardless of the platform being used. For example, as shown in FIG. 4, a networked computer system (400) includes a processor (402), associated memory (404), a storage device (406), and numerous other elements and functionalities typical of today's computers (not shown). The networked computer (400) may also include input means, such as a keyboard (408) and a mouse (410), and output means, such as a monitor (412). The networked computer system (400) is connected to a local area network (LAN) or a wide area network via a network interface connection (not shown). Those skilled in the art will appreciate that these input and output means may take other forms. Further, those skilled in the art will appreciate that one or more elements of the aforementioned computer (400) may be located at a remote location and connected to the other elements over a network.

Embodiments of the invention provide a method to manage CPU consumption time without modifying the operating system thread scheduler for applications executing in the same virtual machine. Specifically, embodiments of the invention allow an isolate executing on the virtual machine that exceeds specified rates of CPU usage to be suspended such that the CPU usage time returns below a specified rate over a period of time. Further, CPU time consumption is recorded at discrete points, while the consumption is considered to be continuous over the usage period. By using a uniform discrete distribution to calculate the time that an isolate is required to sleep, embodiments of the invention prevent jerky behavior caused by attributing CPU usage during the whole interval to a single specific point in time. Further, applications obtain CPU time smoothly due to the uniform attribution of usage over an entire measurement and suspension time period.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing CPU time consumption, comprising:
   obtaining a per-polling period CPU consumption time associated with an isolate executing on a virtual machine for each of a plurality of polling periods;
   computing a usage rate for the isolate over a usage period using the per-polling period CPU consumption time associated with each of the plurality of polling periods within the usage period, wherein a portion of the per-polling period CPU consumption time associated with one of the plurality of polling periods is used in computing the usage rate when the entire one of the plurality of polling periods is not within the usage period;
   comparing the usage rate to a specified rate associated with the isolate; and
   suspending the isolate in the virtual machine when the usage rate exceeds the specified rate.

2. The method of claim 1, further comprising:
   obtaining the specified rate.

3. The method of claim 2, wherein the specified rate is obtained from a policy method.

4. The method of claim 1, further comprising:
   storing the per-polling period CPU consumption time in a data structure.

5. The method of claim 1, wherein suspending the isolate comprises forcing the isolate to sleep for a specified period of time.

6. The method of claim 5, wherein the period of time (Z) is determined by using the equation $I/(U+Z)=Q/U$, where I is the CPU consumption time for the isolate over the usage interval (U), and Q is the specified rate associated with the isolate over the usage interval (U).

7. The method of claim 1, wherein the plurality of polling periods are the length of a polling interval.

8. The method of claim 1, wherein the usage period is the length of a usage interval.

9. The method of claim 1, wherein computing the usage rate comprises summing the per-polling CPU consumption times for the plurality of polling periods within the usage period.

10. The method of claim 1, wherein obtaining the per-polling period CPU consumption time comprises querying an operating system.

11. The method of claim 1, wherein the isolate comprises a plurality of threads executing in the virtual machine.

12. A system, comprising:
   a processor;
   an operating system executing on the processor and configured to provide a CPU consumption time for an isolate during a polling period; and
   a virtual machine executing on the processor and configured to:
     execute the isolate;
     obtain a per-polling period CPU consumption time associated with an isolate executing on a virtual machine for each of a plurality of polling periods;
     compute a usage rate for the isolate over a usage period using the per-polling period CPU consumption time associated with each of the plurality of polling periods within the usage period, wherein a portion of the per-polling period CPU consumption time associated with one of the plurality of polling periods is used in computing the usage rate when the entire one of the plurality of polling periods is not within the usage period;
     compare the usage rate to a specified rate associated with the isolate; and
     suspend the isolate in the virtual machine when the usage rate exceeds the specified rate.

13. The system of claim 12, further comprising:
   an application, wherein the isolate executes on behalf of the application.

14. The system of claim 12, further comprising:
   a data structure configured to store the per-polling period CPU consumption time.

15. The system of claim 12, further comprising:
   a thread scheduler configured to schedule isolates on a CPU.

16. The system of claim 12, wherein the isolate comprises a plurality of threads executing in the virtual machine.

17. The system of claim 12, wherein the virtual machine is further configured to host a polling thread, wherein the polling thread wakes up at least once during each of the plurality of polling periods to obtain the CPU consumption time associated with the isolate.

18. The system of claim 12, wherein suspending the isolate comprises forcing the isolate to sleep for a specified period of time.

19. The system of claim 18, wherein the specified period of time (Z) is determined by using the equation $I/(U+Z)=Q/U$, where I is the CPU consumption time for the isolate over the usage interval (U), and Q is the specified rate associated with the isolate over the usage interval (U).

20. The system of claim 12, wherein computing the usage rate comprises summing the per-polling CPU consumption times for the plurality of polling periods within the usage period.

21. The system of claim 12, wherein each of the plurality of polling periods are the length of a polling interval.

22. The system of claim 12, wherein the usage period is the length of a usage interval.

* * * * *